(12) United States Patent
Kondo et al.

(10) Patent No.: US 7,152,329 B2
(45) Date of Patent: Dec. 26, 2006

(54) ELECTRIC JIGSAW CAPABLE OF IMPROVED ILLUMINATION OF WORKPIECES

(75) Inventors: Masaki Kondo, Anjo (JP); Ichio Sakabe, Okazaki (JP); Shinji Hirabayashi, Chita-gun (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/147,396

(22) Filed: May 15, 2002

(65) Prior Publication Data

US 2002/0170185 A1 Nov. 21, 2002

(30) Foreign Application Priority Data

May 15, 2001 (JP) ............... 2001-145417

(51) Int. Cl.
 B26B 33/00 (2006.01)
 B23B 49/00 (2006.01)
(52) U.S. Cl. ............... 30/392; 30/394; 362/119
(58) Field of Classification Search ............... 30/392, 30/393, 394; 362/119, 89; D8/64
See application file for complete search history.

(56) References Cited

U.S. PATENT DOCUMENTS

| | | | | | |
|---|---|---|---|---|---|
| 2,310,166 | A | * | 2/1943 | Way ............... | 362/119 |
| 3,104,688 | A | * | 9/1963 | Bretthauer ............... | 83/814 |
| 3,404,574 | A | * | 10/1968 | Stelljes ............... | 30/392 |
| 3,457,796 | A | | 7/1969 | Leach et al. ............... | 74/50 |
| 3,504,716 | A | * | 4/1970 | Bush et al. ............... | 30/392 |
| 4,833,782 | A | * | 5/1989 | Smith ............... | 30/392 |
| 5,012,583 | A | * | 5/1991 | Blöchle et al. ............... | 30/392 |
| 5,038,481 | A | | 8/1991 | Smith ............... | 30/392 |
| D332,902 | S | * | 2/1993 | Dobson ............... | D8/64 |
| D339,276 | S | * | 9/1993 | Matsuoka et al. ............... | D8/64 |
| 5,313,376 | A | * | 5/1994 | McIntosh ............... | 362/119 |
| 5,375,495 | A | * | 12/1994 | Bosten et al. ............... | 362/89 |
| 5,388,334 | A | * | 2/1995 | Halsey ............... | 30/392 |
| 5,461,790 | A | * | 10/1995 | Olstowski ............... | 362/119 |
| 5,487,221 | A | * | 1/1996 | Oda et al. ............... | 30/392 |
| 5,680,704 | A | * | 10/1997 | Okubo et al. ............... | 30/392 |
| 5,727,319 | A | * | 3/1998 | Myerchin et al. ............... | 362/119 |
| 5,797,670 | A | * | 8/1998 | Snoke et al. ............... | 362/119 |

(Continued)

FOREIGN PATENT DOCUMENTS

DE 41 08 710 A1 9/1992

(Continued)

Primary Examiner—Timothy V. Eley
Assistant Examiner—Jason Prone
(74) Attorney, Agent, or Firm—Lahive & Cockfield, LLP; Anthony A. Laurentano, Esq.

(57) ABSTRACT

An electric jigsaw (1) includes a main housing (2) containing a gear housing (10), a reciprocating rod (11) vertically projecting from within the gear housing, a saw blade (13) coupled to the rod via a coupling ring (12), and a transparent synthetic resin guard (14) provided at the lower front end of the main housing and the gear housing (10). The transparent guard includes a vertical optical path therethrough and is attached to the gear housing in such a manner as to be horizontally rotatable between a protective position for covering the coupling ring and an open position for exposing the coupling ring. Additionally included in the jigsaw is an insulating cover (15) assembled to the gear housing (10) within the main housing (2) and a downward oriented light-emitting diode (19) disposed at the bottom end of the insulating cover (15) directly above the transparent guard (14) when the guard is in its protective position. The light from the LED is transmitted through the front guard along the optical path, illuminating a workpiece (W) immediately forward of the blade without significant scattering or diffusion.

22 Claims, 5 Drawing Sheets

U.S. PATENT DOCUMENTS

| | | | |
|---|---|---|---|
| D409,469 S * | 5/1999 | Niwa et al. | D8/69 |
| 6,494,590 B1 * | 12/2002 | Paganini et al. | 362/119 |
| 6,511,201 B1 * | 1/2003 | Elrod | 362/119 |
| 6,565,227 B1 * | 5/2003 | Davis | 362/119 |
| 6,644,825 B1 * | 11/2003 | Lin | 362/119 |
| 6,692,200 B1 * | 2/2004 | Peterson | 362/119 |
| D489,238 S * | 5/2004 | Keller | D8/64 |
| 2002/0124419 A1 * | 9/2002 | Hirabayashi | 30/392 |
| 2003/0196337 A1 * | 10/2003 | Wu | 30/392 |
| 2005/0060896 A1 * | 3/2005 | Park | 30/392 |
| 2005/0262707 A1 * | 12/2005 | Wu | 30/392 |

FOREIGN PATENT DOCUMENTS

| | | |
|---|---|---|
| DE | 195 04 432 | 8/1995 |
| DE | 297 15 938 | 3/1998 |
| GB | 1170968 | * 11/1969 |

* cited by examiner

ELECTRIC JIGSAW CAPABLE OF IMPROVED ILLUMINATION OF WORKPIECES

This application claims priority on Japanese Patent Application No. 2001-145417 filed on May 15, 2001, the contents of which are incorporated herein by reference.

BACKGROUND OF THE INVENTION

1. Field of the Invention

The present invention generally relates to electric power tools. More particularly, the present invention relates to a jigsaw including a housing and a blade which projects downward from the front portion of the housing and reciprocates vertically for cutting workpieces.

2. Description of the Related Art

A typical electric jigsaw includes a housing, a motor encased within the housing, a vertically oriented rod or blade holder shaft provided at the front of the housing and driven by the motor so as to make reciprocating motion, and a blade attached to the bottom end of the reciprocating rod via a coupler. Such a jigsaw further includes at the lower front end of the housing a front guard that covers the coupler without being in contact with the coupler. In addition, the front guard is adapted to be movable between a protective position for covering the coupler and an open position for exposing the coupler. To remove the blade from the holder shaft, the guard is moved to the open position to expose and permit manual access to the coupler.

In addition to the foregoing basic structure, certain jigsaws are provided with an illuminant or light source, such as a light-emitting diode or LED, disposed generally vertically downward to illuminate workpieces or mark-off lines scribed on the top surface of workpieces when workpieces are being cut in darkness or in low light conditions.

While the foregoing arrangement achieves its intended objective, it is not free from certain problems and inconveniences that reduce the utility of the device. For example, since the front coupler guard is adapted to move between the two positions, an illuminant cannot be installed in the guard. As a result, an illuminant such as an LED is in many cases disposed in the housing above the front guard. However, if an illuminant is disposed directly above the front guard, the light from the illuminant would be blocked by the coupler guard and not reach the workpiece. Accordingly, the housing must be specially redesigned, for example, to accommodate an illuminant above and forward of the front guard if the light from the illuminant is to reach the area of the workpiece in the proximity of the saw blade, thus increasing the housing size and the manufacturing costs of the entire tool.

An additional problem associated with this conventional arrangement is that by the provision of an illuminant above the front guard, the distance between the light source and the workpiece surface becomes greater, resulting in significant diffusion and scattering of light and thus reduction in the effect of illumination of the workpiece.

SUMMARY OF THE INVENTION

In view of the above-identified problems, an important object of the present invention is to provide an reciprocating cutting tool or jigsaw capable of providing effective illumination of workpieces without redesign or reshaping of the housing even if the tool has a front guard for covering the coupler.

The above objects and other related objects are realized by the invention, which provides a jigsaw comprising: a main housing; a rod projecting downward from the main housing for making reciprocating motion; a coupler connected to the rod; a saw blade connected to the rod via the coupler; a coupler guard which is disposed below the main housing and operable between a protective position for covering the coupler and an open position for exposing the coupler; and an illuminant disposed within the main housing directly above the guard so as to be oriented downward. In this tool, the coupler guard includes an optical path for guiding light from the illuminant downward when the coupler guard is in the protective position. This arrangement ensures sufficient illumination of the workpiece without diffusion despite the increased distance between the illuminant and the workpiece due to the coupler guard interposed between the illuminant and the workpiece. Additionally, in this device, the main housing need not be specially redesigned to accommodate the illuminant, for example, above and forward of the coupler guard, thus avoiding increases in the housing size and in the manufacturing costs of the entire tool.

According to one aspect of the present invention, the coupler guard includes a transparent portion extending vertically therethrough at least directly below the illuminant so as to define the optical path. Accordingly, being at least partially transparent, the coupler guard readily provides an optical guidepath through which the light from the illuminant can reach the workpiece without diffusion or scattering.

According to another aspect of the present invention, the entire coupler guard is made of an optically transparent synthetic resin such that the light from the illuminant can travel downward therethrough substantially without diffusion.

According to still another aspect of the present invention, the jigsaw further comprises a gear housing disposed within the main housing, with the gear housing at least partly accommodating the rod. Furthermore, the illuminant may include a light-emitting diode (LED) assembly disposed substantially vertically between the main housing and the gear housing.

According to yet another aspect of the present invention, the jigsaw further comprises: a drive mechanism including a drive circuit; a lead wire for electrically connecting the LED assembly to the drive circuit; and an insulating cover provided upward from the LED assembly between the main housing and the gear housing for accommodating and routing at least part of the lead wire therealong. Moreover, the LED assembly can include a bottom end from which the light is emitted and a top end to which the lead wire is connected.

According to one feature of the present invention, the jigsaw further comprises a motor housing which is connected to the main housing and at least partly encases the drive mechanism. The motor housing includes a pair of generally opposing flanges protruding from an inner wall of the motor housing in such a manner as to define a groove therebetween for accommodating and routing at least part of the lead wire therealong.

According to another feature of the present invention, the coupler guard is provided in abutment with a lower front end of the main housing adjacent to the illuminant.

According to another feature of the invention, a through-hole is formed in the coupler guard directly below the illuminant, thus providing the optical path along which the light from the illuminant can travel with little diffusion and illuminate a workpiece placed adjacent to the saw blade.

In one aspect, the coupler guard includes means for engaging the gear housing so as to hold the guard in the protective position. The means for engaging may be a claw- or hook-shaped portion.

In another aspect, the gear housing includes a shaft extending from a lower end thereof. Furthermore, the coupler guard has an approximately U-shaped transversal cross-section having first and second end portions, and includes in the first end portion a shaft hole through which the shaft is inserted so as to permit the guard to pivot on the shaft between the two positions. Additionally included in the second end portion of the guard is a protrusion, such as a handle lug, adapted to be manually operated to rotate the guard between the two positions.

The invention is also directed to a reciprocating tool which comprises: a main housing; a bit holder shaft projecting downward from the main housing for making reciprocating motion; a coupler connected to the rod; a tool bit connected to the rod via the coupler; and a coupler guard which is disposed below the main housing and operable between a protective position for covering the coupler and an open position for exposing the coupler. The tool further comprises a light source provided directly above and adjacent to the coupler guard in such a manner as to be oriented downwards. In this tool, the coupler guard includes an optical path along which the light from the light source travels through the guard substantially without diffusion when the coupler guard is in the protective position. The foregoing arrangement ensures sufficient illumination of the workpiece for cutting operations without diffusion despite the increased distance between the light source and the workpiece due to the provision of the coupler guard.

According to still another feature of the present invention, the light source is disposed within the main housing, and the coupler guard includes a transparent portion extending vertically therethrough at least directly below the light source so as to define the optical path.

According to yet another feature of the present invention, the entire coupler guard is constructed from an optically transparent synthetic resin that permits the light from the light source to travel downward therethrough substantially without diffusion. Due to this arrangement, the front guard readily provides an optical guidepath through which the light from the light source can reach the workpiece without significant diffusion or scattering.

In one embodiment, the reciprocating tool further comprises a gear housing disposed within the main housing so as to at least partly accommodating the rod, whereas the light source includes a light-emitting diode (LED) assembly disposed substantially vertically between the main housing and the gear housing.

According to one aspect, the reciprocating tool further comprises: a drive mechanism including a drive circuit; a lead wire for electrically connecting the LED assembly to the drive circuit; and an insulating cover provided upward from the LED assembly between the main housing and the gear housing for accommodating and routing at least part of the lead wire therealong. Furthermore, the LED assembly may include a bottom end from which the light is emitted and a top end to which the lead wire is connected.

In one practice, the reciprocating tool further comprises a motor housing which is connected to the main housing and at least partly encases the drive mechanism, with the motor housing including a pair of generally opposing flanges protruding from an inner wall of the motor housing in such a manner as to define a groove therebetween for accommodating and routing at least part of the lead wire therealong.

In another practice, the coupler guard is provided in abutment with a lower front end of the main housing adjacent to the light source, and the light source is disposed within the main housing.

In still another practice, instead of a transparent coupler guard, a coupler guard with a through-hole therein directly below the light source is provided such that the through-hole defines the optical path along which the light from the light source can travel with little diffusion and illuminate a workpiece placed adjacent to the saw blade.

In one aspect, the coupler guard includes means for engaging the gear housing so as to hold the guard in the protective position.

In another aspect, the gear housing includes a shaft extending from a lower end thereof, and the coupler guard has an approximately U-shaped transversal cross-section having first and second end portions. The coupler guard includes in the first end portion a shaft hole through which the shaft is inserted so as to permit the guard to pivot on the shaft between the two positions and additionally includes in the second end portion a protrusion adapted to be manually operated to rotate the guard between the two positions.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

Figure 5A:
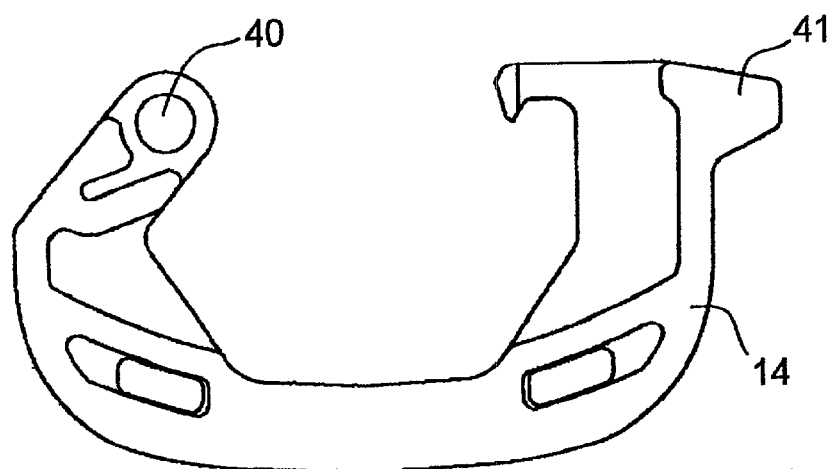
FIG. 5A is a plan view of an front coupler guard 14 of the jigsaw shown in FIG. 1.
Figure 5B:
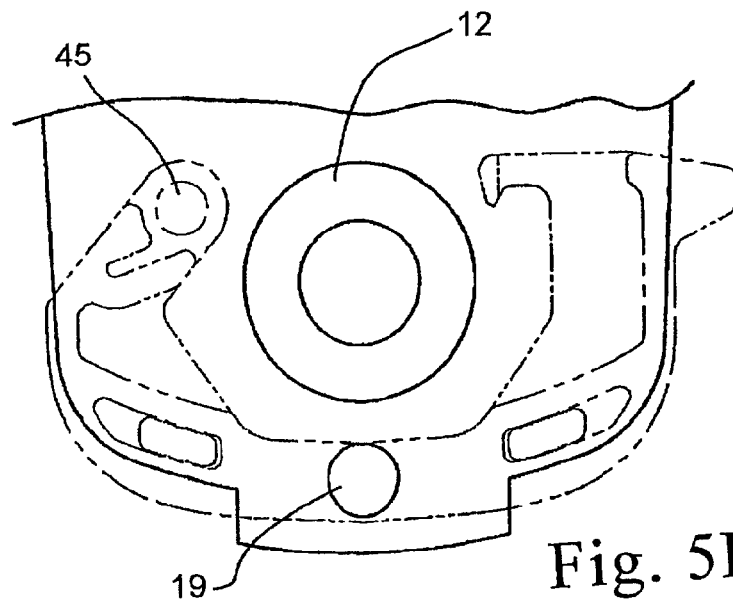
Figure 5C:
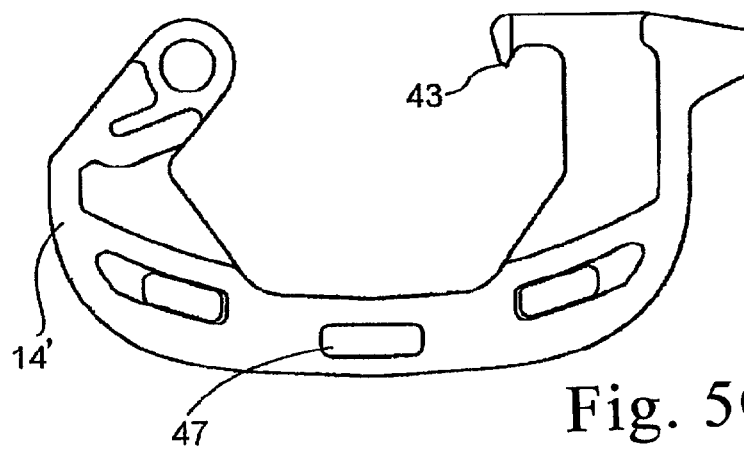

FIG. 5B is another plan view of the front guard 14 drawn in phantom lines in the protective position, showing the front guard surrounding the coupling ring 12 on three sides except for the portion of the ring opposing the gear housing; and FIG. 5C shows an alternate embodiment of a front guard 14' having a vertical through-hole 47 therein directly below a light source 19 to provide an optical path along which the light from the light source can be transmitted with little diffusion and illuminate a workpiece placed adjacent to the saw blade.

DETAILED DESCRIPTION OF THE PREFERRED EMBODIMENTS

Preferred embodiment of the present invention will be described hereinafter with reference to the attached drawings.

Figure 1:
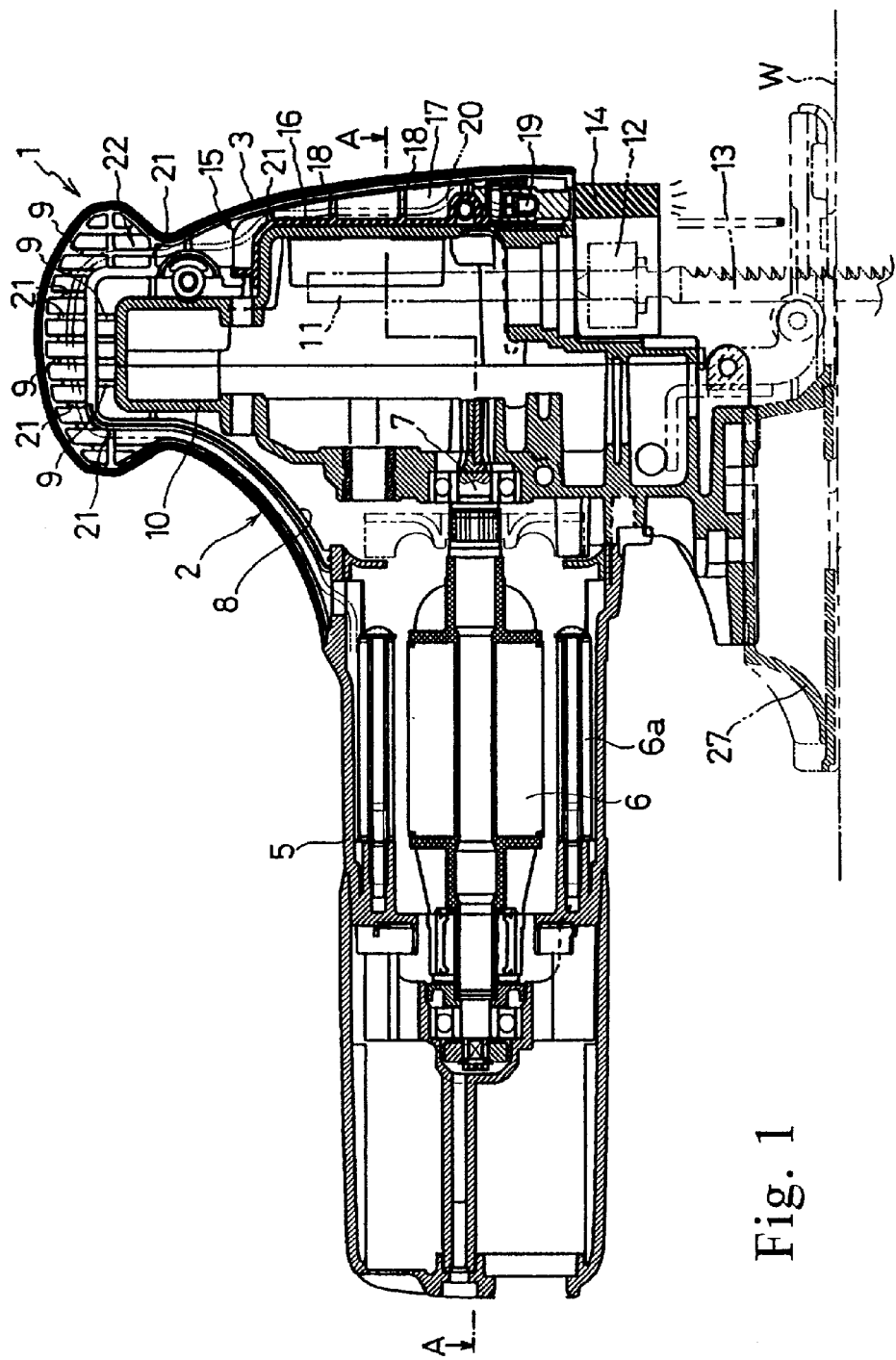
FIG. 1 is a vertical cross-sectional view of a reciprocating cutting tool or jigsaw 1 according to the present invention.

FIG. 1 is a vertical cross-sectional view of an electric power jigsaw 1 in accordance with the present invention. The jigsaw 1 includes a base plate 27, a pair of split-half clamshells 3 and 4 fitted together to form a main housing 2 mounted on the base plate 27, and an approximately cylindrical motor housing 5 which is connected to and projects from the rear wall of the main housing 2 (as used herein, the term rear is intended to indicate the left side of FIG. 1). Additionally to FIGS. 1 and 2, the motor housing 5 contains a horizontally oriented motor 6 with a field element 6a and an armature spindle 7 which projects therefrom into a gear housing 10 within the main housing 2 and is coupled to reduction gears and a motion converter mechanism such as a cam (neither shown). The mechanism converts the rotational motion of the motor to a linearly reciprocating motion of a rod or blade holder shaft 11 vertically oriented in the front portion of the main housing 2. As illustrated, the gear housing 10 is supported within the main housing 2 by means of an inner wall 8 and a plurality of ribs 9 provided within the main housing 2. Moreover, a saw blade 13 is removably attached to the bottom end of the blade holder shaft 11 via a coupling ring 12 disposed below the gear housing 10. As shown in two-dot-chain lines in FIGS. 1 and 2, the saw blade 13 extends in alignment with the longitudinal axis of the shaft 11. The electric jigsaw 1 further includes a front guard 14 made of transparent synthetic resin that covers the coupling ring 12 from the front without being in contact with the ring 12. The front coupler guard 14 has an approximate U-shape on a horizontal cross-section. In addition, the front guard 14 is attached to the gear housing 10, for example, with a shaft 45 (see FIG. 5B) in such a manner as to be horizontally rotatable or pivotal between a protective position for covering the coupling ring 12 (the position shown in FIG. 1) and an open position (not shown) for exposing the coupling ring 12. For example, to remove the blade 13 from the blade holder shaft 11, the front guard 14 is rotated to the open position to expose and permit manual access to the coupling ring 12.

Figure 2:
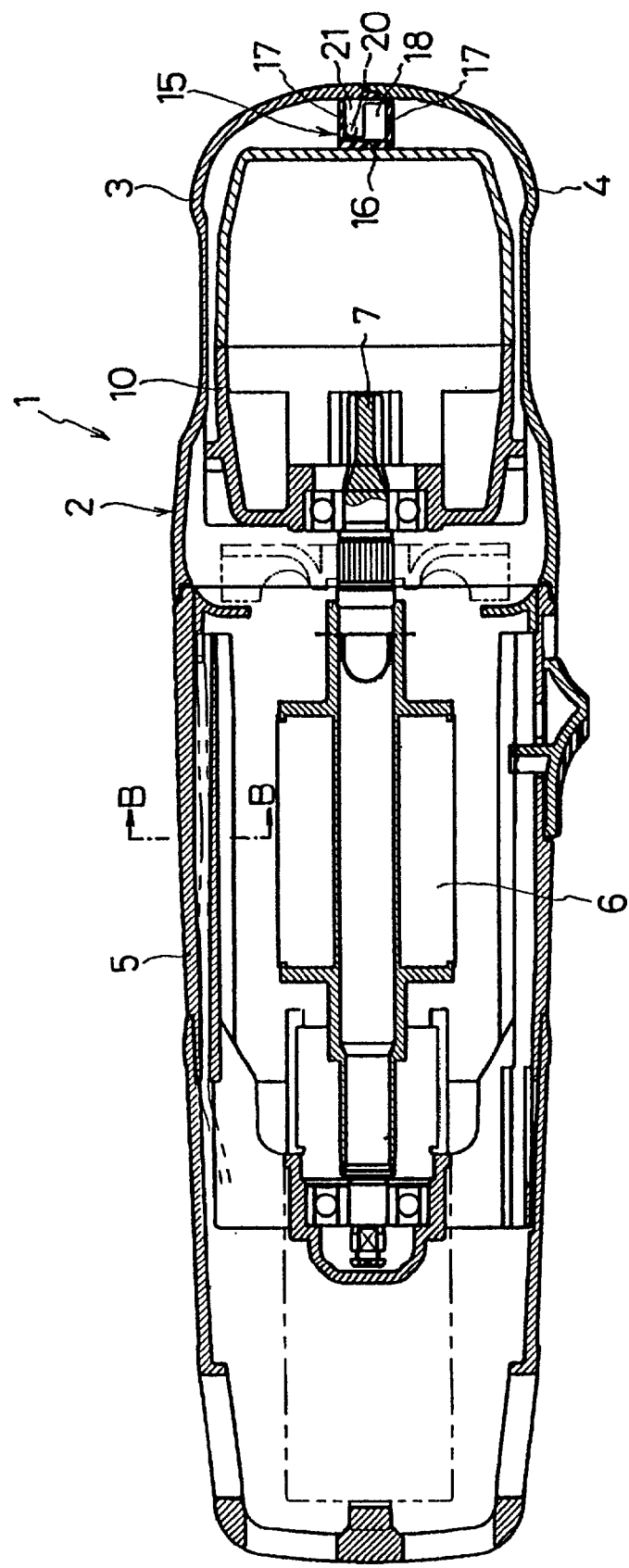
FIG. 2 is a horizontal cross-sectional view of the jigsaw 1 taken along line A—A of FIG. 1.
Figure 3:
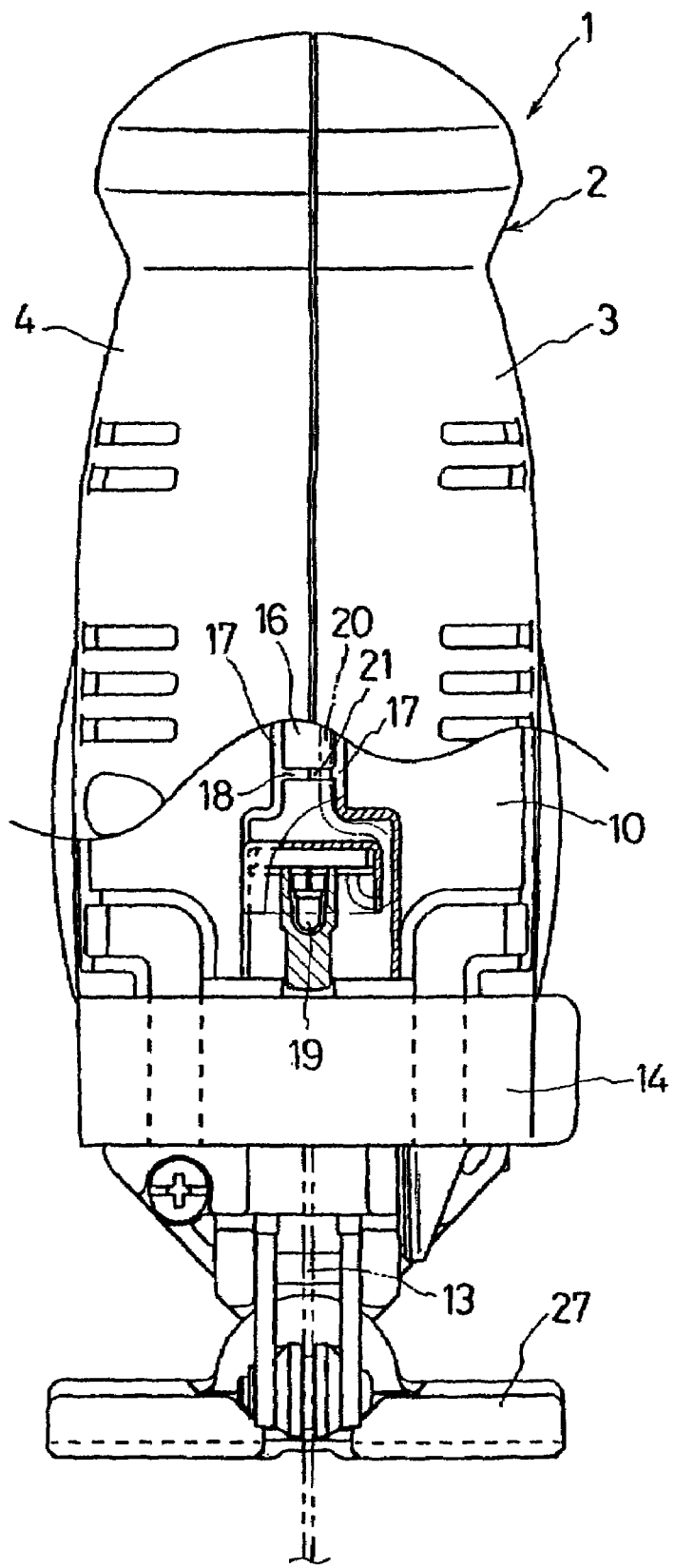
FIG. 3 is a front elevational view of the jigsaw 1 shown in FIG. 1.

Referring to FIGS. 1–3 (FIG. 3 being a front elevational view of the jigsaw 1), disposed at the front of the gear housing 10 between the main housing 2 and the gear housing 10 is an insulating cover 15 comprised of an elongated base plate 16 extending in conformity to the front shape of the gear housing 10, a pair of side plates 17 extending from the side edges of the base plate 16 to conform to the inner geometry of the main housing, and a plurality of ribs 18 horizontally projecting from the base plate 16 between the side plates 17. As shown in FIG. 2, the insulating cover 15 also has an approximate U-shape on a transversal or horizontal cross section. A downward oriented light-emitting diode or LED assembly 19 is mounted on the lower front end of the insulating cover 15 so as to illuminate objects below through the gap between the main housing 2 and the gear housing 10 and through the clear synthetic resin of the guard 14, which is located directly underneath the LED assembly 19 when the guard 14 is in the protective position.

FIG. 5A shows a plan view of the front guard 14, which additionally includes on the upper-left end a shaft accommodating hole 40 through which the shaft or pin 45 (see FIG. 5B) extending downward from the gear housing 10 is inserted so as to permit the guard 14 to pivot on the shaft 45 between the two positions. The front guard 14 further includes on the other end a handle lug 41 with which to manually open and close the guard 14 and a claw 43 which engages the gear housing 10 when the guard 14 is operated to the protective position, thus maintaining the guard 14 in the protective position. Referring particularly to FIG. 5B, when the front guard 14 is in the protective position (indicated in double-dot-dash lines), the LED 19 is located directly above the guard 14, such that the guard 14 provides an optical path along which the light from the illuminant can travel downward, thus reaching the workpiece area below without obstruction. As also shown in FIG. 5B, the front guard 14 generally surrounds the coupling ring 12 on three sides except for the portion of the ring 12 opposing the gear housing 10.

Referring again to FIGS. 1–3, provided in the ribs 18 of the insulating cover 15 and the ribs 9 abutting the outer surface of the inner wall 8 of the half clamshell 3 are cut-outs 21 through which the lead wire 20 of the LED assembly 19 is passed. Accordingly, a guide passage 22 for routing the lead wire from the LED assembly into the motor housing 5 is defined through the space between the half clamshell 3 and the inner wall 8 as well as between the half clamshell 3 and the insulating cover 15.

Figure 4:
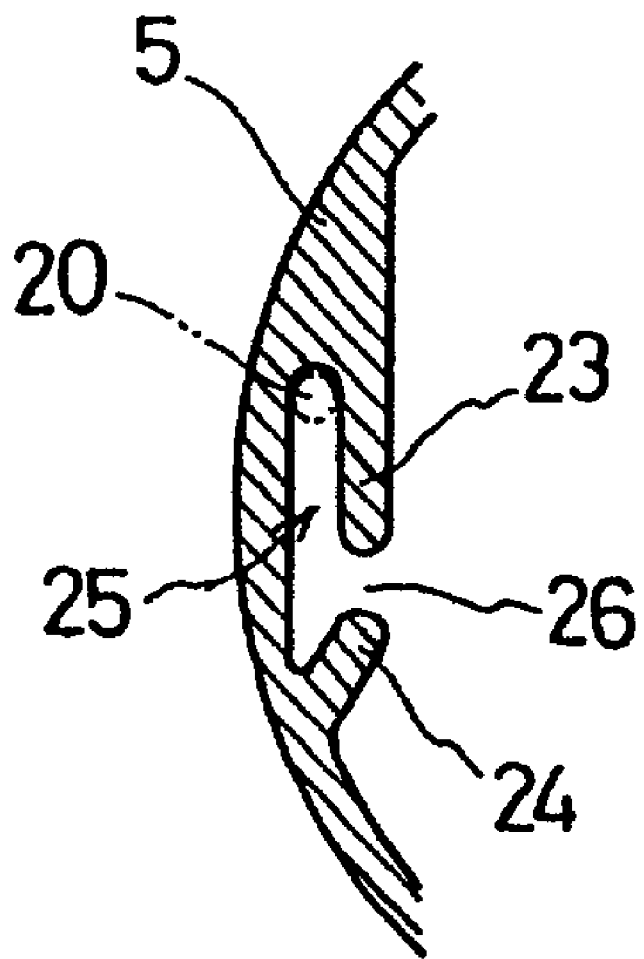
FIG. 4 is a vertical cross-sectional view of a side portion of the motor housing 5 of the jigsaw 1 taken along line B—B of FIG. 2.

Turning now to FIG. 4 (a vertical cross-sectional view of a side portion of the jigsaw 1 taken along line B—B of FIG. 2), a lead passageway or groove 25 for additionally routing the lead wire 20 is formed between two partitions or flanges 23 and 24 on the inner surface of the motor housing 5 along the entire axial length of the motor housing 5. As illustrated, the flanges 23 and 24 define a slot 26 therebetween through which the lead wire 20 is inserted into and laid along the groove 25 during the assembly of the reciprocating cutting tool 1. It should be noted that the flange 24 projects from the motor housing 5 at an angle to the flange 23 on the transversal cross-section. Even if the lead wire 20 (shown on a cross-section in a broken line) is displaced from its intended position in the groove 25, the angled flange 24 is designed to guide the lead wire 20 to the lower corner in the groove 25, thus preventing the lead wire from slipping out of the groove. As the lead wire 20 is thus routed inside the motor housing 5 without the lead 20 exposed to the internal mechanisms of the electric tool 1, the possibility of pinching the lead wire is greatly reduced (such pinching is known to occur in conventional tools during assembly, for example, when the field element 6a of the motor 6 is forced into the motor housing 5 during assembly).

In an electric jigsaw 1 thus constructed, when the tool's switch (not shown) is operated with the base plate 27 set on the workpiece W, the motor 6 is activated to cause reciprocating motion of the rod 11 and the blade 13, thus making a cut in the workpiece. Concurrently with the activation of the motor 6, the LED assembly 19, which is electrically connected to the drive circuit of the motor 6, is turned on to illuminate the workpiece W. In this embodiment, although the LED 19 is located directly above the front coupler guard 14 in its protective position, the light emitted from the LED 19 passes through the clear synthetic resin of the guard 14 without diffusion and illuminates the workpiece from directly above. This ensures sufficient illumination of the area immediately forward of the blade 13 and presents a clear view of a mark-off line or other reference mark on the workpiece W even in a dark environment.

As can be readily understood from the foregoing description, the arrangement of the foregoing embodiment (i.e., the downward provision of the LED assembly 19 disposed immediately above the front guard 14 in its protective position with the guard 14 made of an optically transparent material capable of guiding therethrough the light from the LED downward onto the workpiece) ensures sufficient illumination of the workpiece W although the distance between the light source 19 and the workpiece is increased by the front guard 14 interposed between the light source and the workpiece. Accordingly, the main housing need not be specially redesigned or reshaped to accommodate the illuminant, for example, above and forward of the front guard as in certain conventional tools, thus avoiding increases in the housing size and the manufacturing costs of the entire tool 1. Furthermore, the front coupler guard 14, being made of a transparent material, readily provides an optical path for guiding the light from the LED 19 to the workpiece W.

In the foregoing embodiment, the entire front guard 14 is made of a transparent material to provide a guidepath of light or optical path from the LED assembly 19. However, insofar as the light from the LED 19 can be transmitted to the workpiece area without significant diffusion or scattering, any other suitable design will suffice. For example, only a vertical portion of the guard 14 between its top and bottom surfaces directly below the LED 19 may be constructed from a clear or transparent synthetic resin or other equivalent material so as to provide an optical path for guiding the light from the LED 19.

FIG. 5C shows a plan view of an alternate embodiment of a front guard 14' which includes a through-hole 47 formed directly below the LED assembly 19 to provide an optical path along which the light from the LED can be transmitted with little diffusion and scattering and illuminate mark-off lines on workpieces. It should be noted that the guard 14', if provided with such a through-hole, need not be constructed from a transparent material as above, since the light from the light source can pass through the hole and reach workpieces without diffusion or obstruction.

Moreover, those with ordinary skill in the art will readily understand that the LED assembly 19 may be replaced with any other suitable light source, such as a midget light bulb or a tube lamp, in order to achieve the same effect.

The arrangement of the invention (i.e., the provision of a downward oriented illuminant disposed immediately above the front guard in the protective position with the guard capable of guiding the light from the illuminant or light source downward onto a workpiece) ensures sufficient illumination of the workpiece without diffusion despite the increased distance between the illuminant and the workpiece due to the front guard interposed between the illuminant and the workpiece. In addition, as described above, the front guard may be at least partly constructed from a transparent material so as to readily provide an optical guidepath through which the light from the light source can reach the workpiece without diffusion or scattering.. Accordingly, the main housing need not be specially redesigned to accommodate the illuminant or light source, for example, above and forward of the front guard, thus avoiding increases in the housing size and in the manufacturing costs of the entire tool.

EQUIVALENTS

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

The invention claimed is:

1. A jigsaw comprising:
   a main housing;
   a rod projecting downward from the main housing for making reciprocating motion;
   a coupler connected to the rod;
   a saw blade connected to the rod via the coupler;
   a coupler guard which is disposed below the main housing and rotatably attached thereto to rotatably operate between a protective position for covering the coupler and an open position for exposing the coupler;
   an illuminant disposed within the main housing directly above the guard so as to be oriented downward along a vertical axis substantially parallel to a vertical side wall of the coupler, wherein the vertical side wall of the coupler guard defines an optical path extending vertically through the side wall from a top portion, adjacent to a bottom end portion of the illuminant, to a bottom portion, opposed to the top portion, wherein the vertical side wall and the optical path are aligned with the illuminant when the coupler guard is in the protective position, the optical path guiding light from the illuminant downward onto an area immediately forward of the saw blade when the coupler guard is in the protective position; and
   a base plate through which extends the saw blade, wherein the coupler guard is adjacent to the housing below the illuminant and spaced from the base plate when in the protective position.

2. A jigsaw in accordance with claim 1, wherein the coupler guard includes a transparent portion extending vertically therethrough at least directly below the illuminant so as to define the optical path.

3. A jigsaw in accordance with claim 1, wherein the entire coupler guard is made of an optically transparent synthetic resin that permits light from the illuminant to travel downward therethrough substantially without diffusion.

4. A jigsaw in accordance with claim 1, wherein the coupler guard is provided in abutment with a lower front end of the main housing adjacent to the illuminant.

5. A jigsaw in accordance with claim 1, wherein the coupler guard includes a through-hole therein directly below the illuminant, the through-hole providing the optical path along which light from the illuminant can travel with little diffusion and illuminate a workpiece placed adjacent to the saw blade.

6. The jigsaw of claim 1, wherein the illuminant is provided in a lower front portion of the main housing below a top end of the rod.

7. The jigsaw of claim 1, wherein the area immediately forward of the saw blade aligned with the optical path and illuminant is not covered by the coupler guard when in said protective position.

8. A jigsaw in accordance with claim 1 further comprising a gear housing disposed within the main housing, the gear housing at least partly accommodating the rod, wherein the illuminant includes a light-emitting diode (LED) assembly disposed substantially vertically between the main housing and the gear housing.

9. A jigsaw in accordance with claim 8, wherein the gear housing includes a shaft extending from a lower end thereof, and wherein the coupler guard has an approximately U-shaped transversal cross-section having first and second end portions, the coupler guard including in the first end portion a shaft hole through which the shaft is inserted so as to permit the guard to pivot on the shaft between the two positions and additionally including in the second end portion a protrusion adapted to be manually operated to rotate the guard between the two positions.

10. A jigsaw in accordance with claim 8, wherein the coupler guard includes means for engaging the gear housing so as to hold the guard in the protective position.

11. A jigsaw in accordance with claim 8 further comprising: a drive mechanism including a drive circuit; a lead wire for electrically connecting the LED assembly to the drive circuit; and an insulating cover provided upward from the LED assembly between the main housing and the gear housing for accommodating and routing at least part of the lead wire therealong, wherein the LED assembly includes a bottom end from which light is emitted and a top end to which the lead wire is connected.

12. A jigsaw in accordance with claim 11 further comprising a motor housing which is connected to the main housing and at least partly encases the drive mechanism, the motor housing including a pair of generally opposing flanges protruding from an inner wall of the motor housing in such a manner as to define a groove therebetween for accommodating and routing at least part of the lead wire therealong.

13. A reciprocating tool comprising:
a main housing;
a bit holder shaft projecting downward from the main housing for making reciprocating motion;
a coupler connected to the bit holder shaft;
a tool bit connected to the bit holder shaft via the coupler;
a coupler guard which is disposed below the main housing and rotatably operable between a protective position for covering the coupler and an open position for exposing the coupler;
a downward oriented light source provided directly above and substantially perpendicular to a top surface of the coupler guard, wherein the coupler guard includes an optical path aligned with the light source when the coupler guard is in a protective position and extending vertically through a side wall of the coupler guard between the illuminant and an area immediately forward of a saw blade coupled to the bit holder shaft via the coupler, such that light from the light source travels through the optical path of the guard substantially without diffusion when the coupler guard is in the protective position; and
a base plate through which extends the saw blade, wherein the coupler guard is adjacent to the housing below the light source and spaced from the base plate when in the protective position.

14. A reciprocating tool in accordance with claim 13, wherein the light source is disposed within the main housing, and the coupler guard includes a transparent portion extending vertically therethrough at least directly below the light source so as to define the optical path.

15. A reciprocating tool in accordance with claim 13, wherein the light source is disposed within the main housing, and the entire coupler guard is made of an optically transparent synthetic resin that permits light from the light source to travel downward therethrough substantially without diffusion.

16. A reciprocating tool in accordance with claim 13, wherein the coupler guard includes a through-hole therein directly below the light source, the through-hole providing the optical path along which light from the light source can illuminate a workpiece placed adjacent to the tool bit.

17. A reciprocating tool in accordance with claim 13, wherein the coupler guard is provided in abutment with a lower front end of the main housing adjacent to the light source, and further wherein the light source is disposed within the main housing.

18. A reciprocating tool in accordance with claim 13 further comprising a gear housing disposed within the main housing, the gear housing at least partly accommodating the bit holder shaft, wherein the light source includes a light-emitting diode (LED) assembly disposed substantially vertically between the main housing and the gear housing.

19. A reciprocating tool in accordance with claim 18, wherein the coupler guard includes means for engaging the gear housing so as to hold the guard in the protective position.

20. A reciprocating tool in accordance with claim 18, wherein the gear housing includes a shaft extending from a lower end thereof, and wherein the coupler guard has an approximately U-shaped transversal cross-section having first and second end portions, the coupler guard including in the first end portion a shaft hole through which the shaft is inserted so as to permit the guard to pivot on the shaft between the two positions and additionally including in the second end portion a protrusion adapted to be manually operated to rotate the guard between the two positions.

21. A reciprocating tool in accordance with claim 18 further comprising: a drive mechanism including a drive circuit; a lead wire for electrically connecting the LED assembly to the drive circuit; and an insulating cover provided upward from the LED assembly between the main housing and the gear housing for accommodating and routing at least part of the lead wire therealong, wherein the LED assembly includes a bottom end from which light is emitted and a top end to which the lead wire is connected.

22. A reciprocating tool in accordance with claim 21 further comprising a motor housing which is connected to the main housing and at least partly encases the drive mechanism, the motor housing including a pair of generally opposing flanges protruding from an inner wall of the motor housing in such a manner as to define a groove therebetween for accommodating and routing at least part of the lead wire therealong.

* * * * *